Sept. 15, 1964 H. H. TURNER 3,148,588
CAM CUTTING MACHINE
Filed March 22, 1961 6 Sheets-Sheet 1
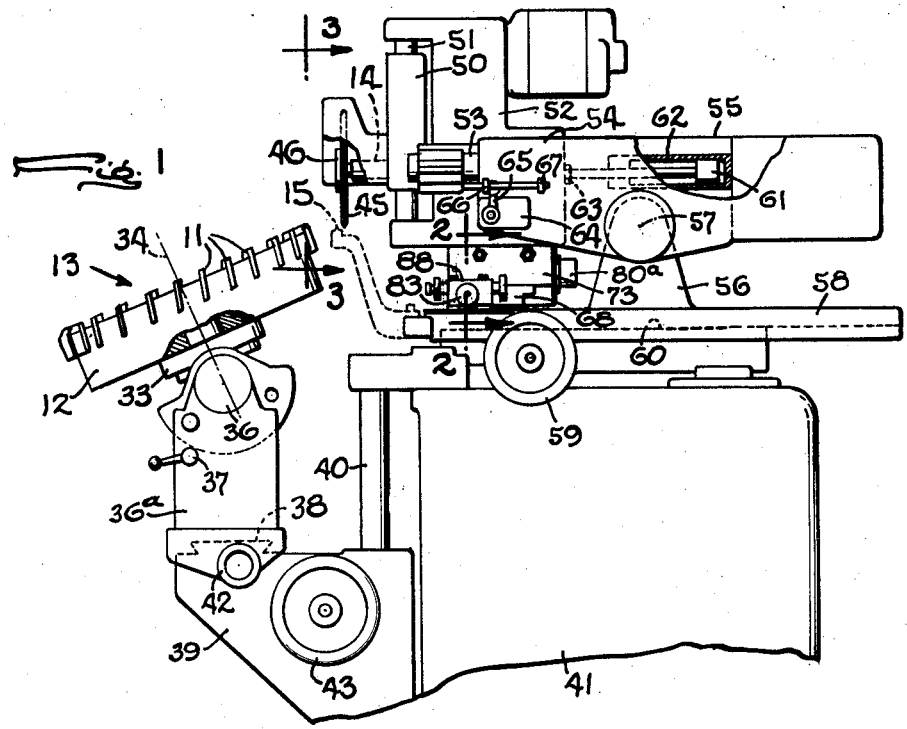
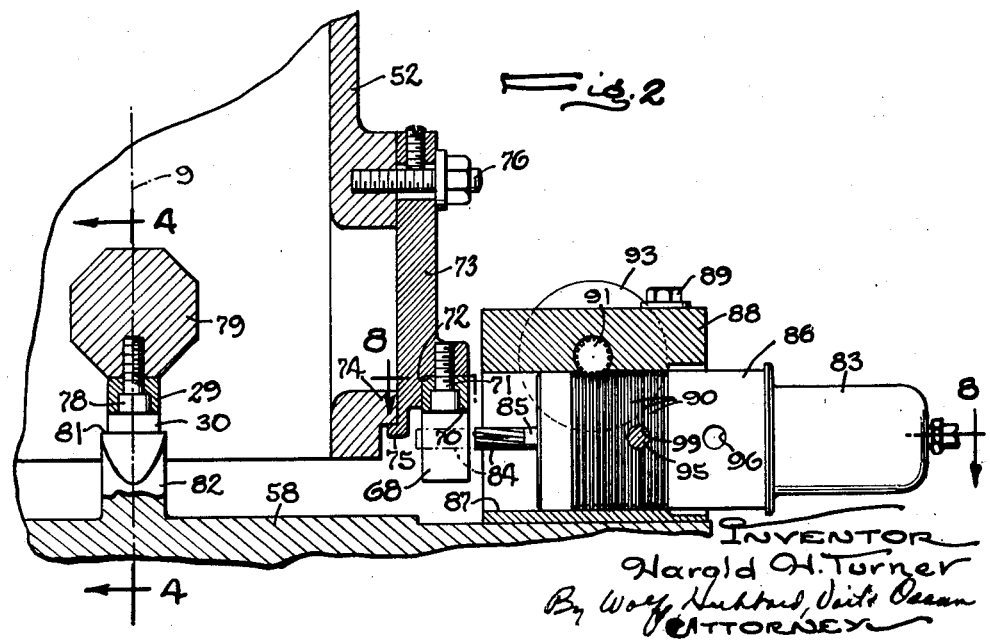
INVENTOR
Harold H. Turner
By Wolf Hubbard Voit Osann
ATTORNEY

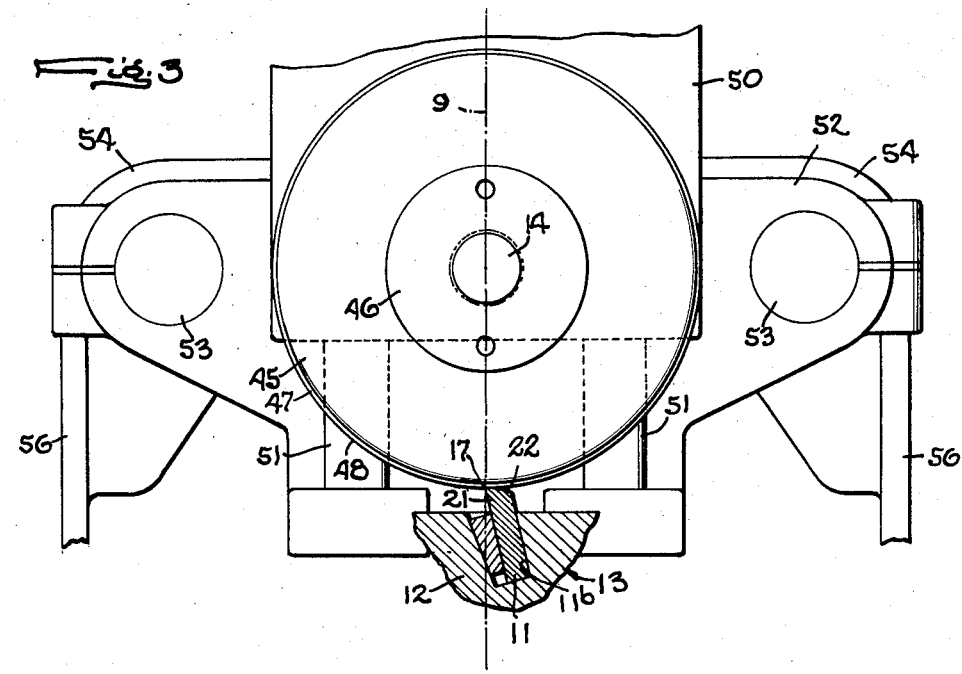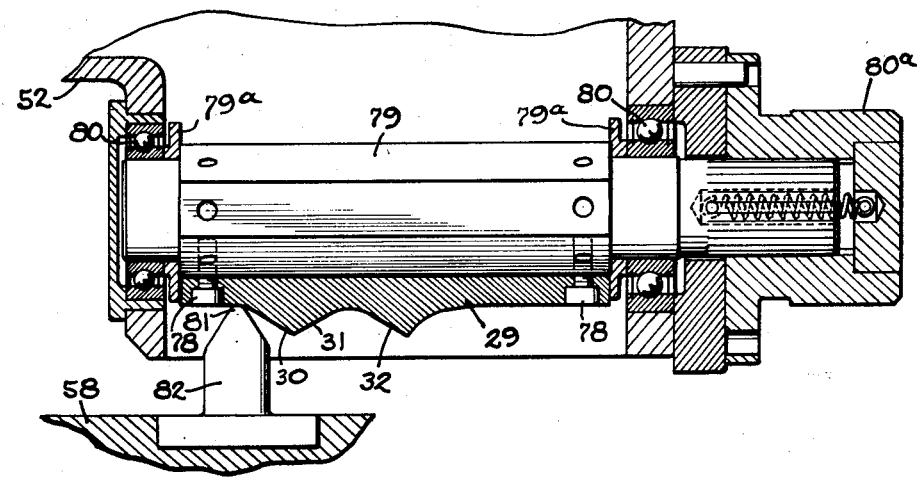

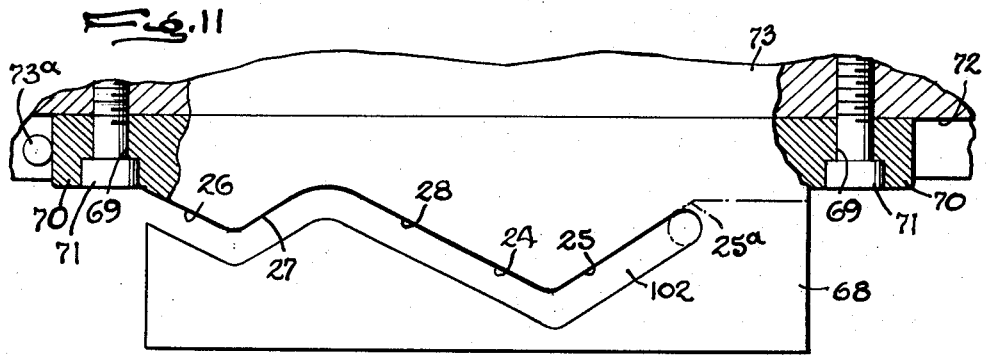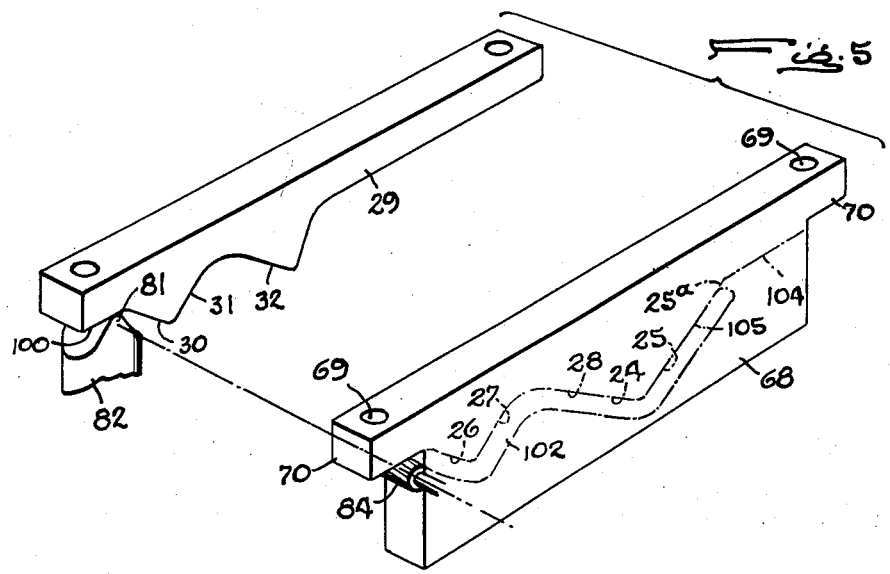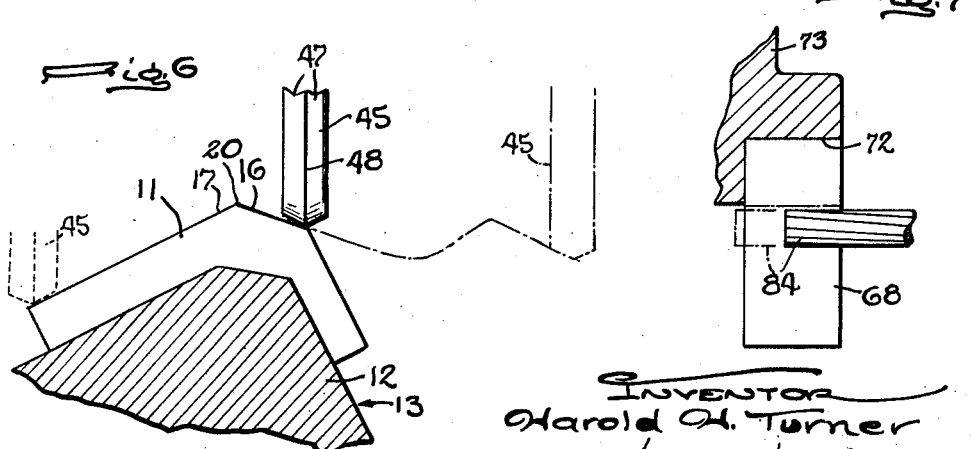

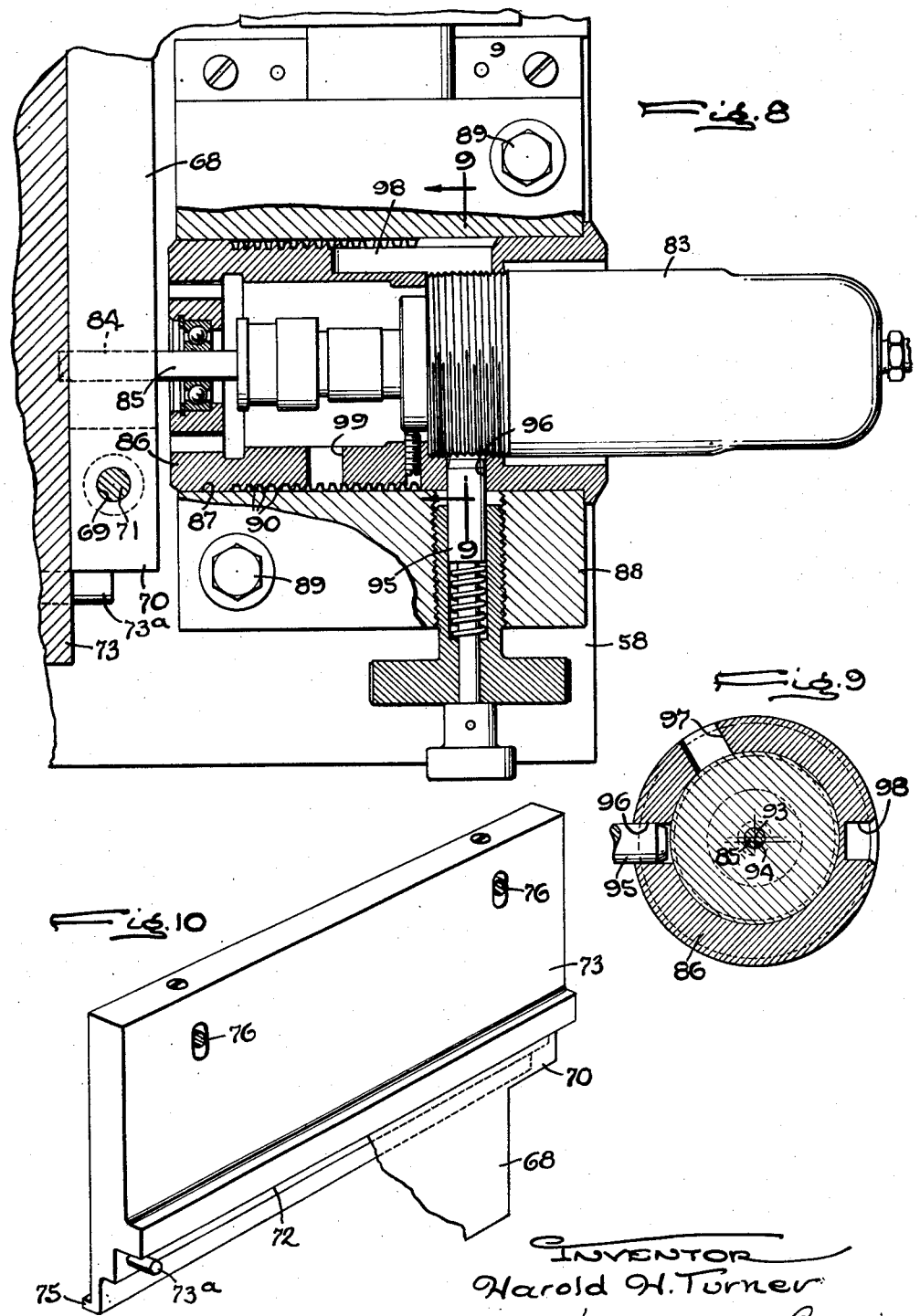

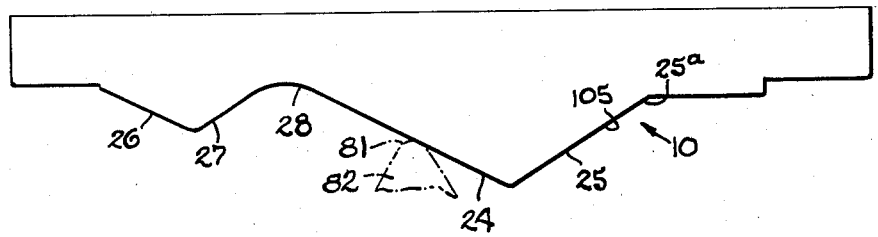
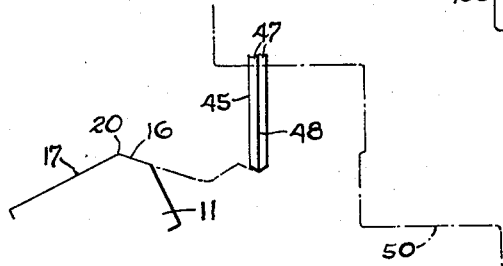
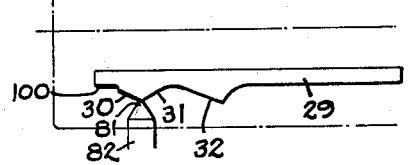
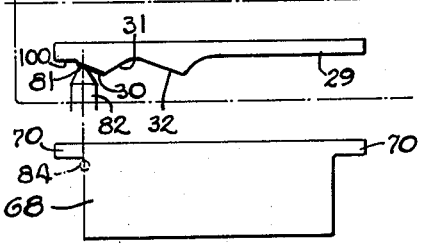

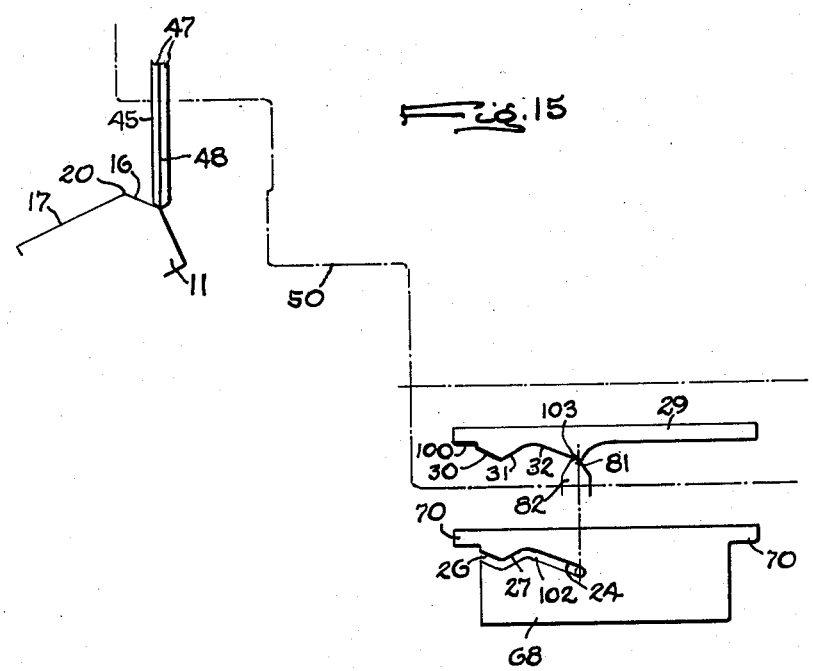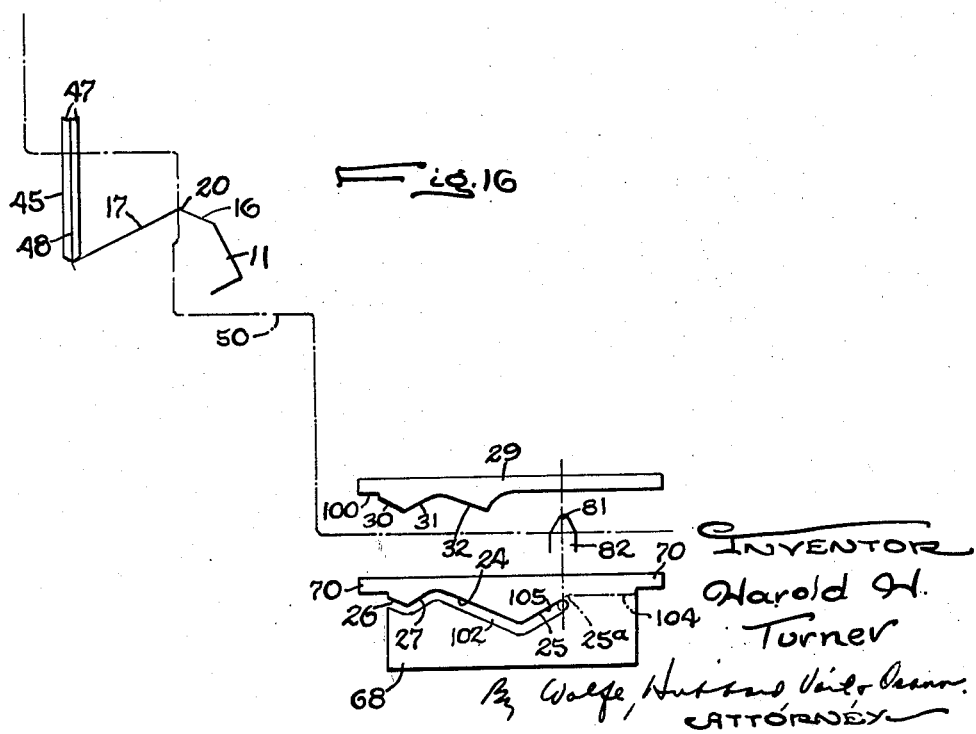

United States Patent Office 3,148,588
Patented Sept. 15, 1964

3,148,588
CAM CUTTING MACHINE
Harold H. Turner, North Clearwater, Fla., assignor to The Ingersoll Milling Machine Company, Rockford, Ill., a corporation of Illinois
Filed Mar. 22, 1961, Ser. No. 97,583
7 Claims. (Cl. 90—13.5)

This invention relates to a machine for cutting a cam to be used in controlling the movements of a grinding wheel or other tool in sharpening the edge of a cutter blade to a predetermined profile.

The primary object is to provide a machine of the above character in which one of the blades of the cutter subsequently to be sharpened is used as a template to control the profile of the cam which is then usable in the same machine to control the sharpening of cutters having blades of the same profile.

Another object is to incorporate in the cam an additional surface for controlling the dressing of the grinding wheel in the course of sharpening the cutter blade.

A further object is to provide a follower of novel character for tracing the blade profile.

The invention also resides in the novel manner of forming the cam surface for leading the grinding wheel into and out of engagement with the blade edge being sharpened.

Other objects and advantages of the invention will become apparent from the following detailed description taken in connection with the accompanying drawings, in which FIGURE 1 is a fragmentary elevational view of a cam cutting machine embodying the novel features of the present invention.

FIG. 2 is a fragmentary section taken along the line 2—2 of FIG. 1.

FIG. 3 is a fragmentary section taken along the line 3—3 of FIG. 1.

FIG. 4 is a fragmentary section taken along the line 4—4 of FIG. 2.

FIG. 5 is a fragmentary perspective view of a cam being cut and a cam element for leading the follower onto and off from the cutter blade.

FIG. 6 is a fragmentary view showing different positions of the cutter control follower in the course of its engagement with a blade edge.

FIG. 7 is a fragmentary view similar to FIG. 2 showing a different position of the cam cutter.

FIG. 8 is a fragmentary section taken along the line 8—8 of FIG. 2.

FIG. 9 is a section taken along the line 9—9 of FIG. 8.

FIG. 10 is a perspective view of the holder for the cam blank.

FIG. 11 is a side view of the cam blank after completion of the cutting operation.

FIG. 12 is a side view of the completed cam.

FIGS. 13 to 16 are schematic views showing the parts in different positions in the course of cutting a cam.

In the drawings, the invention is shown incorporated in a machine for cutting a cam 10 (FIG. 12) whose profile conforms in part to that of the cutting edge on a blade 11 clamped in the body 12 of a multiple blade face milling cutter 13. The machine is of special construction so that the cam 10 produced thereby may subsequently be used in the same machine to sharpen all of the blades 11 of the cutter or of other cutters having cutting edges of the same profile.

Briefly stated, the sharpening is effected by the edge of a grinding wheel (not shown) fixed on the end of a rotatable spindle 14 (FIG. 1) while being reciprocated axially back and forth along a predetermined path to pass the wheel edge first over a stationary diamond point 15 (FIG. 1) to dress the wheel periphery to the desired cross-section and then successively along the side and end cutting edges 16 and 17 of a blade of the cutter while the latter is held in a predetermined operating position. The dressing point 15 faces upwardly and, during the sharpening operation, is fixed to the end of an arm 18 with the point radially spaced outwardly from the cutter and disposed in a vertical plane 9 (FIGS. 2 and 3) including the axis of the spindle 14. The arm, shown in phantom in FIG. 1, is secured detachably as by bolts 19 to a part of the machine so that it may be removed from the machine during the cam cutting operation.

As in most face milling cutters, the blade 11 is clamped as by a wedge 11$^a$ (FIG. 3) in a slot 11$^b$ of the body 12 and formed with edges 16 and 17 (FIG. 6) joined at a corner 20 and projecting from the periphery and end of the body. The cutting edges are defined by the intersection of a cutting face 21 and a clearance face 22 which is ground away to effect the sharpening.

The edges 16, 17 of the blade are used as a template to control the cutting of surfaces 24 and 25 on the cam 10 which, as shown in FIGS. 2, 12 and 16, comprises an elongated bar of metal or reinforced plastic. Spaced along the bar from the surfaces 24, 25 are other surfaces 26 and 27 which, in the sharpening operation, control the engagement of the grinding wheel periphery with the dressing point 15 and thus impart the desired contour to the wheel. The cutting of the surfaces 26, 27 and a surface 28 is controlled by an auxiliary template 29 (FIGS. 2, 4, 5 and 13) which comprises an elongated bar of plastic or the like similar to the cam 10 and having an inclined surface 30-32 which controls the formation of the surface 26-28 on the cam 10. For the cam cutting operation, a follower is substituted in the machine for the grinding wheel and the position of this follower 45 when out of engagement with the blade edge is controlled by the surface 32 which is shaped to bring the follower into proper engagement with the blade edge and transfer the control of the cam cutter from the auxiliary template 29 to the main template or blade edge and thus form the cam surface 28. During the sharpening operation, the latter supports the grinding wheel during its movement between the dressing point and the blade edge.

During cutting of the cam, the cutter 13 is clamped to a support 33 with its axis 34 extending upwardly at the proper angle for locating the blade 11 at the angle desired for proper engagement with the grinding wheel during the subsequent sharpening operation. Also the blade is disposed at about the level of the dressing point 15 and its edges 16 and 17 are located in the vertical plane 9 (FIG. 3) through the point and the axis of the spindle.

To provide for such location of the blade edge, the cutter support 33 is adjustable in various ways. It is indexable about the cutter axis 34 to enable different blades of the cutter to be brought into operative position and carries horizontal trunnions 36 (FIG. 1) journaled in laterally spaced upright posts 36$^a$ to permit adjustment of the cutter about the trunnion axis after releasing a screw clamp 37. The lower ends of the posts 36 are guided along ways 38 on and adapted to be clamped to a saddle 39 slidable vertically along laterally spaced bars 40 on the front of the machine bed 41. Adjustment of the cutter support along the guides 38 and 40 may be affected by turning hand wheels 42 and 43.

In cutting the cam 10, the blade edges 16 and 17, which are of a configuration desired to be produced in the use of the cam in subsequent sharpening operations, are used as a template for engaging the following 45 which preferably comprises a circular disk 45 detachably secured as by a nut 46 (FIGS. 1 and 3) to the outer end of the spindle 14 so as to occupy during the cam cutting the same position as the grinding wheel during the sharpening operations. Like the grinding wheel, the disk periphery is tapered and the converging faces 47 thereof preferably intersect at a relatively sharp edge 48 so as to provide for line contact as shown in FIG. 3 with the clearance face 22 of the cutter blade being used as the cam template.

The spindle 14 is journaled in and projects generally horizontally from the front of a slide 50 adjustable along vertical bars 51 fixed to the forward end of a head 52 having horizontal guide rods 53 fixed to its opposite sides. These rods slide in tubular guides 54 on a saddle 55 fulcrumed on posts 56 upstanding from a base 58 which is normally fixed to the top of the machine bed 41 but is adapted, by manipulating a hand wheel 59 for adjustment horizontally along guideways 60. The head 50 and the follower 45 thereon are thus adapted to rock up and down about the axis 57 defined by the posts 56 while it is being shifted back and forth in the guides 54.

Herein, such shifting is effected by a hydraulic actuator having a piston 61 reciprocable in a cylinder 62 on the saddle 55 and its rod coupled at 63 to the rear side of the head 52. The cycles of the actuator are controlled in a manner well understood in the art by suitable switch mechanism 64 having a pivoted arm 65 actuated by adjustable dogs 66 and 67 spaced along the head. With switches now available, the limits of the forward and return strokes of the actuator may be determined with great accuracy.

The cam 10 is cut from a blank 68 (FIGS. 2, 5, 7, 11 and 14) comprising an elongated rectangular bar of plastic having accurately sized and spaced holes 69 extending through end lugs 70 for receiving screws 71 by which the bar is clamped in a socket 72 (FIGS. 2 and 10) of a plate 73 with the end of the bar abutting a locating pin 73ª. The plate is located accurately relative to the head 52 as by interlocking of flanges 74 and 75 and clamped against and held by screws 76. As shown in FIG. 2, the blank socket 72 is disposed near the bottom of the head 52 and offset outwardly from the center plane 9.

The auxiliary template 29 is similarly apertured and secured by screws 78 (FIGS. 2 and 4) along one side of a shaft 79 of polygonal cross-section journaled at opposite ends in bearings 80 in the bottom portion of the head 52 so as to be indexable, as by turning a knob 80ª to bring cams secured to different sides of the shaft into operative position. In the operating position shown in FIG. 2, the template bar 29 is disposed in and centered relative to the plane 35 with its surfaces 30, 31 or 32 bearing under the weight of the head 50 against the arcuate surface 81 of a follower 82 in the form of a stud upstanding from the normally stationary base 58 beneath the head 52. In this position, the auxiliary template 29 parallels the cam blank 68 and the mountings are spaced equidistantly from the plane of the follower disk 45. As a result, the cam 10, after being cut while fastened in the socket 72, may be transferred to and substituted for the auxiliary template 29 and then used subsequently to control the movements of the grinding wheel in the sharpening of the cutter blades.

Removal of material from the lower edge portion of the cam blank 68 to form the surfaces 25 to 28 is effected by a cylindrical milling cutter 84 (FIGS. 2, 5, 7, 8 and 14) driven at high speed by a rotary air motor 83. The cutter 84 is of the same diameter as the follower surface 81 over which the auxiliary template 29 rides. It projects transversely of the plane 9 and is carried by the outer end of a spindle 85 journaled in a barrel-like cylindrical housing 86 guided in and slidable axially along the bore 87 of a casing 88 clamped as by bolts 89 to the top of the normally fixed base 58. Annular ribs 90 spaced along the housing form rack teeth which mesh with the teeth of a pinion 91 journaled in the casing 88 and rotatable by turning a hand wheel 93 (FIG. 2) to advance or retract the cutter axially and thus determine the width of the cut taken by the cutter in each forward stroke of the head 52.

To enable the cutter 84 to take roughing, semi-finishing, and finishing cuts, the axis 93 of the cutter spindle 85 is disposed eccentrically as illustrated in FIG. 9 relative to the axis 94 of the sleeve 86. Thus, by turning the cutter housing to different angular positions, the depth of the cut taken by the cutter 84 in the vertical plane of the blank 68 may be gauged accurately, the selected depth being fixed by entry of a spring loaded retractable pin 95 into one of several holes 96 and 97 for finishing and semi-finishing cuts and a slot 98 for roughing cuts. With the pin disposed in the slot 98, the cutter may, by adjusting the hand wheel 93, be advanced axially and thus take cuts of varying widths across the blank as is sometimes desirable during the roughing cuts (see FIG. 7). The pin 95, by entry into a hole 99 (FIG. 8), serves to hold the cutter housing retracted and the cutter inactive as shown in FIG. 2.

*Operation*

Preparatory to cutting a cam 10 for subsequent use in sharpening the blades 11 of a given cutter 13, the grinding wheel that may have been used in previous sharpening operations is removed from the spindle 14 and the follower disk 45 substituted and clamped to the end of the spindle 14 by the nut 46. The auxiliary template 29 is secured to the shaft 79 with the latter indexed for proper engagement of the template with the stationary follower 82 as shown in FIGS. 2 and 4. The cutter is secured to the support 33 and, by the various adjustments above described, the edges 16 and 17 of one blade 11 are disposed in the vertical plane 8 which includes the dressing point 15. Thus, the outer blade edge 16 is disposed at about the level of the point and at an angle relative to the horizontal substantially equal to that of the template surface 32.

First, the head 52 is moved by the hydraulic actuator 61, 62 to the position shown in FIG. 13, in which the point of intersection of the template surfaces 30, 31 is centered on the tip 81 of the follower 82 when the edge 48 of the follower disk 45 and the tip of the dressing point 15 are in the same vertical plane. The slide 50 is then lowered relative to the head until the follower edge 48 comes into contact with the dressing point. The bracket 18 is then detached from the head 52 and removed from the machine.

Next, the head 52 is advanced by its actuator to bring the follower into vertical alinement with the outer end of the blade edge 16 as shown in full in FIG. 6. The template surface 32 will then rest against the tip 81 of the follower 82. Then, by adjusting the cutter support 33 in the various ways above described, the blade edge is brought into contact with the follower edge 48, the cutter axis 34 being inclined so as to dispose the blade edge at the same angle relative to the horizontal as the template surface 32.

The head 52 is next advanced by the actuator 61, 62 to slide the follower 45 along the blade edges 16 and 17 to the extreme inner end of the latter edge as shown in phantom and at the left in FIG. 6. The dog 67 is then adjusted into contact with the switch arm 65 and thus adapted to interrupt the advance of the head during the cam cutting operation and subsequently in the sharpening operations on the same cutter using the cam thus produced.

When the head 52 is retracted to the limit position shown in FIG. 1, the surface 100 on the template 29 will rest on the follower 82 as shown in FIG. 5 and thus determine the vertical height of the head 52 and the cutter 84. The latter, when advanced as shown in FIG. 5, will be disposed ahead of the end of the cam blank 68.

For the roughing cuts along the cam blank, the pin 95 (FIG. 8) is disposed in the slot 98 and the housing 86 advanced axially as shown in FIG. 7 to extend the cutter 84 only part way across the blank. In the actual cutting of the cam, the head 52 is advanced from its retracted position (FIGS. 1 and 14) at a slow feed rate. In the initial part of the forward stroke, the vertical positions of the head 52 and cutter 84 are determined solely by the template 29 as the surfaces 31 and 32 ride over the follower 82 to cut a groove 102 in the blank and form the corresponding surfaces 26, 27. As the advance continues and before the follower disk 45 reaches the blade edge 16, the template surface 32 is presented to the follower 82 which sustains the weight of the head 52 as the latter is raised gradually while the surface 24 is being formed by the cutter. With the template surface 32 and the outer blade edge 16 positioned vertically as above described and inclined at substantially the same angles relative to the horizontal, the follower disk will traverse the path shown in phantom in FIG. 6 and thus be brought into the plane of the blade edge 16 as it approaches the latter. When a point 103 on the surface 32 reaches the follower 82, the edge 48 of the follower disk 45 will come into contact with the outer end of the blade edge 16 as shown in FIG. 6 thus transferring the weight of the head 52 from the template to the blade 11 by a smooth transition off from the cam and follower elements and onto the blade edge. At this point in the cutting of the cam surface 28, the followers 82 and 45 will contact the template 29 and the blade edge 16 simultaneously.

As the advance of the head continues, the follower edge 48 will ride up the blade edge 16 during which the cam surface 24 is cut, then over the corner 20 of the blade edge and then downwardly along the edge 17 during which the groove 102 is extended further as shown in FIG. 16 to form the cam surface 25. During this part of the stroke, the template surface 81 will ride past the follower 82 as shown in FIG. 16. At the end of the stroke of the head as shown in FIG. 16, the follower edge 48 will be at the inner end of the blade edge 17, the cutter thus stopping short of the end of the cam blank 68.

Another cut along the blank may then be taken after advancing the cutter axially for example all the way across the blank as shown in FIG. 7. Then, the cutter may be raised slightly to take a semi-finishing cut. This is accomplished by retracting the pin 95 out of the slot 98 (FIG. 9) and turning the casing 86 far enough to permit the pin to enter the hole 97. After the semi-finish cut along the rough cut edges of the blank, the machine may be conditioned for taking a finishing cut by turning the casing 84 and entering the pin 95 in the hole 96.

In the cam thus formed, the groove 102 is stopped short of the inner end of the blank as shown in FIGS. 11 and 16. To complete the cam, the blank is cut along the line 104 (FIG. 11) by means of a saw or other suitable tool. This line is an extension of the surface 25 and the resulting surface 25ª is disposed at the same angle relative to the surface 105 which determines the position of the cam not only during its formation by the cutter 84 but also in its use during the subsequent sharpening operation. For the latter, the finished cam as shown in FIG. 12 is mounted on the shaft 79 in place of the template 29. By virtue of the surface 25ª, the grinding wheel may, during sharpening of the cutter blades, be advanced somewhat beyond the inner end of the edge 17 during which the head 52 will be supported by engagement of the follower 82 and the cam surface 25ª.

By forming on one integral cam blank the surfaces 30, 31 and 24, 25 which control the dressing of the grinding wheel and its motion during sharpening of the blade edges, all of the wheel motions are correlated angularly without the necessity of further adjustments of the machine preparatory to the sharpening operation. Since the cam surfaces 24 and 28 are formed in fixed relation and in precise alinement, the grinding wheel will, in the sharpening operation, be led gradually onto the blade edge 16 and come into contact with the outer end in a precisely defined position, again without the necessity of preliminary machine adjustments.

Since the blade follower used in cutting the cam has an active circular edge 48, the character of its engagement with the blade edge is the same as with the grinding wheel subsequently used in the sharpening operatiton, the proper relation between the cam, the cutter and the wheel for the sharpening operation is established automatically simply by substituting the grinding wheel for the follower disk. The depth of cut taken along the blade edge during sharpening thereof is determined by vertical adjustment of the cutter support 39 through the medium of the hand wheel 43. Moreover, the entire periphery of the latter is available for use during the cam cutting operation.

It will be apparent from the foregoing that all of the cam surfaces required for use in the sharpening operations on blades of a given contour may be formed with great accuracy without requiring special skill by the machine operator and in the same machine which is used subsequently to control the dressing of the wheel and the sharpening of the blade edges. As a consequence, numerous inaccuracies that would otherwise be likely to occur are completely eliminated while at the same time achieving substantial savings in time and equipment costs.

Numerous advantages result from the formation on a single cam all of the necessary surfaces 24–28 for controlling the grinding wheel in subsequent cutter sharpening operations. Thus, to prepare the machine for sharpening the cutter using a cam prepared in the above manner, it is only necessary to substitute the cam for the template 29 used in the cam cutting operation. This is accomplished by clamping the cam bar to the indexable shaft 79 by means of the screws 78 after the forward end of the cam has been moved into abutment with the locating flanges 79ª (FIG. 4) which are disposed in the same relation with respect to the shaft as the pin 73ª (FIG. 10) and are relative to the socket 72 in which the blank is supported during the cutting operation. Thus, no precise adjustments of the cam relative to either the dressing point or the cutter to be sharpened are involved in conditioning the machine for a sharpening operation.

Also, it will be observed that the surfaces 24, 25 and 28 formed on the cam are not of precisely the same contour as the blade edges 16 and 17 which control the cutting of these surfaces. However, this difference is immaterial since during the cam cutting operation the blank 68 and the template 29 are disposed in precisely the same relation with respect to the axis 57 about which the follower 45 rocks in following the blade edges. That is to say, the template and the blank are disposed at precisely the same level below the axis 57 and spaced horizontally the same distance behind the follower disk 45. As a result, the finished cam when mounted on the shaft 79 will cause the grinding wheel to sharpen the blade edge to precisely the same contour as that which controlled the formation of the surfaces 24, 25 in the cam cutting operation.

I claim as my invention:

1. A machine for cutting a cam to conform to the changing contour of the edge of a cutter blade, said machine having, in combination with said blade, means supporting the blade with said edge facing upwardly and lying in a vertical plane, a normally stationary horizontal base member, a saddle member mounted thereon for horizontal reciprocation back and forth in said plane, a head mounted on said saddle member to swing about a horizontal axis extending transversely of said plane, a spindle journaled on and projecting from said head in said plane, a circular follower disk mounted on said spindle perpendicular to said plane and engageable at its periphery with said blade edges, a cam blank secured to one of said members and extending along said plane, a power driven cutter mounted on the other of said members and engageable with said blank to remove material therefrom and contour the edge thereof, means for reciprocating said saddle member back and forth through a range longer than said blade edge and during the advancing stroke to first approach said disk to one end of the edge and then move the disk along the edge throughout the length thereof, and means acting during said approaching movement to support said head in a position to bring the edge of said follower disk into the plane of and then onto the end of said blade edge whereby to effect a smooth transition in the support of said follower and head off from the support means and onto said blade edge.

2. A machine for cutting a cam to conform to the changing contour of the edge of a cutter blade, said machine having, in combination with said blade, means supporting the blade with said edge facing upwardly and lying in a vertical plane, a normally stationary horizontal base member, a saddle member mounted thereon for horizontal reciprocation back and forth in said plane, a head mounted on said saddle member to swing about a horizontal axis extending transversely of said plane, a spindle journaled on and projecting from said head in said plane, a follower disk mounted on said head and having an arcuate surface concentric with said spindle axis and engageable at its preiphery with said blade edge, a cam blank secured to one of said members and extending along said plane, a power driven cutter mounted on the other of said member and engageable with said blank to remove material therefrom and contour the edge thereof, means for reciprocating said saddle member back and forth through a range longer than said blade edge and during the advancing stroke to first approach said disk to one end of the edge and then move the disk along the edge throughout the length thereof, and cam and follower elements secured to said base and said head and engaging each other to support the head during the approach of said follower to the end of said blade edge, said elements being shaped to disengage as the follower comes into contact with such end whereby to effect a smooth transition in the transfer of the weight of said head off from said elements and onto said blade edge and cause the head to rock up and down during the stroke of said saddle member first in accordance with the shape of said cam elements and then according to the changing contour of said blade edge and thereby reproduce on said cam blank the successive contours of said cam element and said blade edge.

3. A machine for cutting a cam to conform to the changing contour of the edge of a cutter blade, said machine having, in combination with said blade, means supporting the blade with said edge facing upwardly and lying in a vertical plane, a normally stationary horizontal base member, a saddle member mounted thereon for horizontal reciprocation back and forth in said plane, a head mounted on said saddle member to swing about a horizontal axis extending transversely of said plane, a follower mounted on said head and having a downwardly facing arcuate edge concentric with an axis lying in said plane and engageable with said blade edge in different angular positions of the follower, a cam blank secured to one of said members and extending along said plane, a power driven cutter mounted on the other of said members and engageable with said blank to remove material therefrom and contour the edge thereof, means for reciprocating said saddle member back and forth through a range longer than said blade edge and during the advancing stroke to first approach said follower edge to one end of the blade edge and then move the follower along the latter throughout the length thereof, and cam and follower elements secured to said base and said head and engaging each other to support the head during the approach of said follower edge to the end of said blade edge, said cam element being shaped to dispose said follower edge in the plane of the end of said blade edge as it approaches the latter and then to disengage said follower element whereby to effect a smooth transition in the transfer of weight of said head off from said elements and onto the blade edge.

4. A machine for cutting a cam to conform to the changing contour of the edge of a cutter blade, said machine having, in combination with said blade, means supporting the blade with said edge lying in an upright plane with one end portion of the edge inclined upwardly from the end of the edge, a normally stationary horizontal base member, a saddle member mounted thereon for horizontal reciprocation back and forth in said plane, a head mounted on said saddle member to swing about a horizontal axis extending transversely of said plane, a follower mounted on said head for engagement with said blade edge, a cam blank secured to one of said members and extending along said plane, a power driven cutter mounted on the other of said members and engageable with said blank to remove material therefrom and contour the edge thereof, means for reciprocating said saddle member back and forth through a range longer than said blade edge and during the advancing stroke to first approach said follower to said blade end and then move the follower up said inclined portion and along the edge throughout the length thereof, and cam and follower elements secured to said base and said head and engaging each other to support the head during the approach of said follower to said blade end, said cam element being shaped to bring said follower onto the blade end along a path disposed at substantially the same angle of incline as said end portion of the edge and then to disengage said follower element whereby to effect a smooth transition in the transfer of weight of said head off from said elements and onto the blade edge.

5. A machine for cutting a cam to conform to the changing contour of the edge of a cutter blade, said machine having, in combination with said blade, means supporting the blade with said edge exposed, a normally stationary base member, a saddle member mounted thereon for reciprocation back and forth in the plane of said blade edge, a head mounted on said saddle member to swing about an axis extending transversely of said plane, a follower mounted on said head and engageable at its periphery with said blade edge, a cam blank secured to one of said members and extending along said plane, a power driven cutter mounted on the other of said members and engageable with said blank to remove material therefrom and contour the edge thereof, means for reciprocating said saddle member back and forth through a range longer than said blade edge and during the advancing stroke to first approach said follower to one end of the blade edge and then move the follower along the edge throughout the length thereof, and cam and follower elements secured to said base and said head and engaging each other to support the head during the approach of said follower to the end of said blade edge, said elements being shaped to disengage as the follower comes into contact with such end and to effect a smooth transition in the transfer of the support of said head off from the elements and onto the blade edge.

6. A cam cutting machine as defined in claim 5 in which said cam element and said cam blank are spaced horizontally and vertically equal distances from said follower and said axis.

7. A cam cutting machine as defined in claim 5 in which said cam element and said cam blank are disposed side by side and corresponding parts thereof are spaced horizontally and vertically equal distances from said follower and said axis.

References Cited in the file of this patent

UNITED STATES PATENTS

| 2,412,619 | Kindermann et al. | Dec. 17, 1946 |
| 2,424,347 | Wilson | July 22, 1947 |
| 2,738,712 | Gill | Mar. 20, 1956 |

FOREIGN PATENTS

| 851,468 | Great Britain | Oct. 19, 1960 |